(12) United States Patent
Nakajima

(10) Patent No.: US 6,396,775 B1
(45) Date of Patent: May 28, 2002

(54) MAGNETO-OPTICAL DEVICE AND RECORDING/REPRODUCING METHOD

(75) Inventor: Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/513,827

(22) Filed: Feb. 25, 2000

(30) Foreign Application Priority Data

Feb. 25, 1999  (JP) ............................................. 11-048956

(51) Int. Cl.$^7$ ................................................ G11B 11/00
(52) U.S. Cl. ................ 369/13.13; 369/13.17; 369/126; 369/44.24
(58) Field of Search ..................... 369/13, 126, 44.23, 369/44.24, 44.16, 118, 44.11, 44.14, 44.35, 13.28, 13.13, 112.26, 275.5, 13.17, 13.43, 13.44, 13.45, 13.24; 264/1.1, 2.7

(56) References Cited

U.S. PATENT DOCUMENTS

| 5,808,973 | A | | 9/1998 | Tanaka ......................... 369/14 |
| 6,243,350 | B1 | * | 6/2001 | Knight et al. ................ 369/126 |
| 6,262,953 | B1 | * | 7/2001 | Kahlman et al. ......... 369/44.11 |
| 6,270,696 | B1 | * | 8/2001 | Jain et al. ..................... 264/1.1 |

FOREIGN PATENT DOCUMENTS

WO          9849675          11/1998

OTHER PUBLICATIONS

Tamanoi et al., Proceedings of Magento–Optical Recording International Symposium, vol. 19, Supplement S1, pp. 421–424 (1995).
Awano et al., American Institute of Physics, vol. 69, pp. 4257–4259 (1996).
Terris et al., American Institute of Physics, vol. 68, pp. 141–143 (1996).
Patent Abstract of Japan, vol. 009, No. 148, Jun. 22, 1985.

* cited by examiner

*Primary Examiner*—Ali Neyzari

(57) ABSTRACT

Light emitted from a light source is converged by an objective lens, and an auxiliary lens increases an effective numerical aperture to project the light on a recording medium. The temperature of a recording mark recording on the recording medium is increased by the projection of the light, and saturation magnetization which is in accordance with the information is generated, thus generating magnetic flux. There is a reproducing magnetic layer, which is provided on the auxiliary lens. Magnetization generated on the reproducing magnetic layer has an effect on the polarization direction of the reflected light at the reproducing magnetic layer. Reflected light from the reproducing magnetic layer reaches a photodetector to generate a reproduced signal.

18 Claims, 15 Drawing Sheets

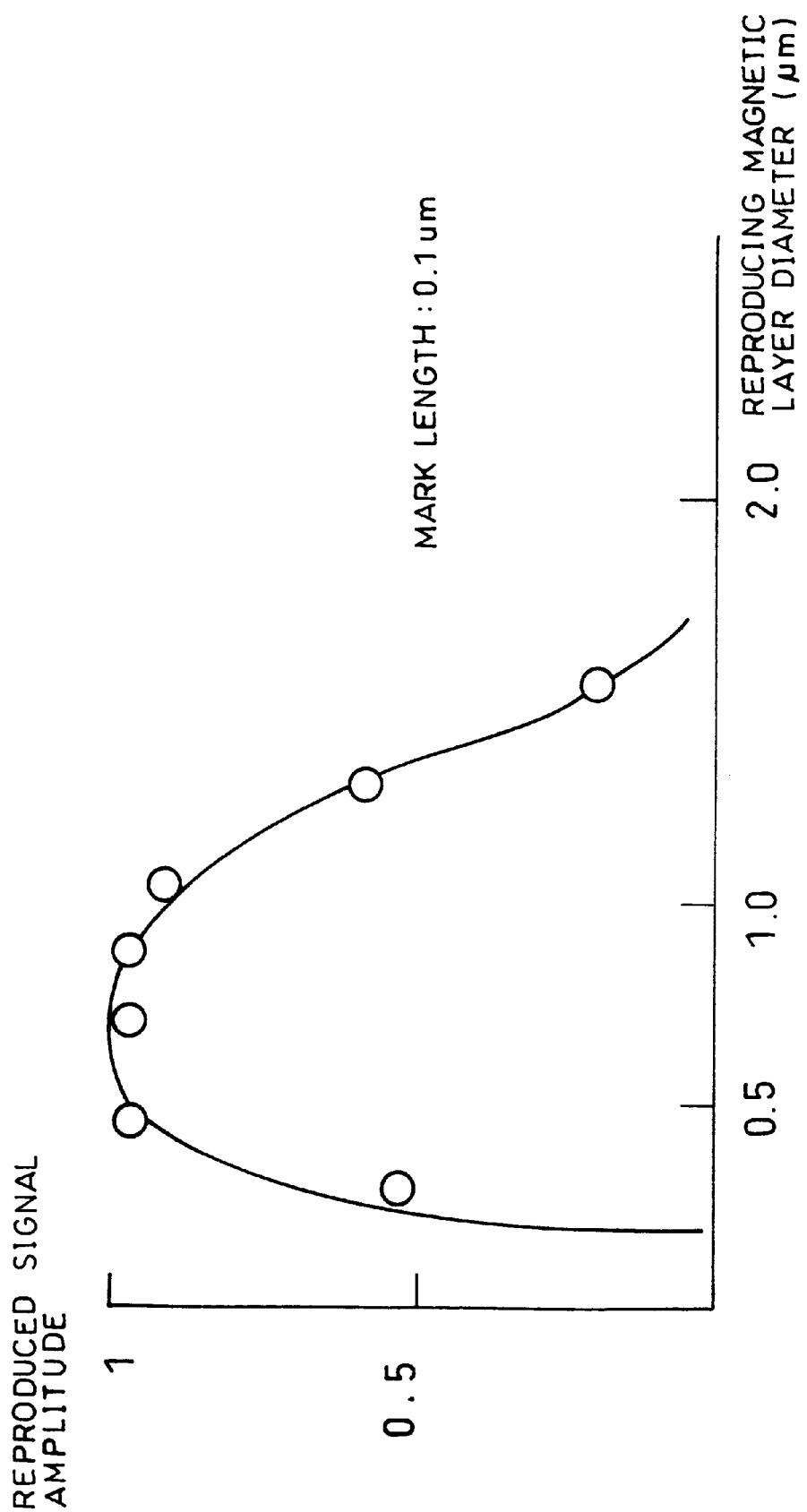

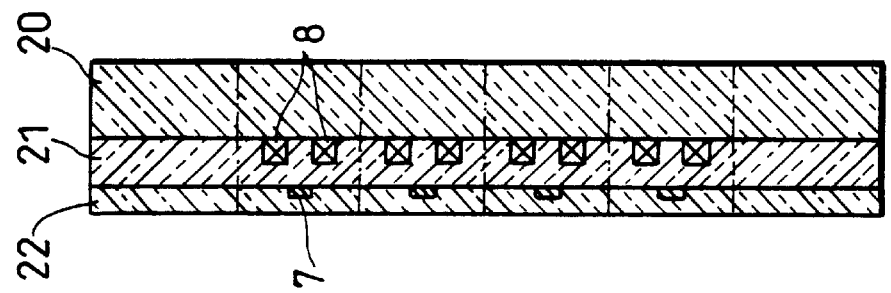
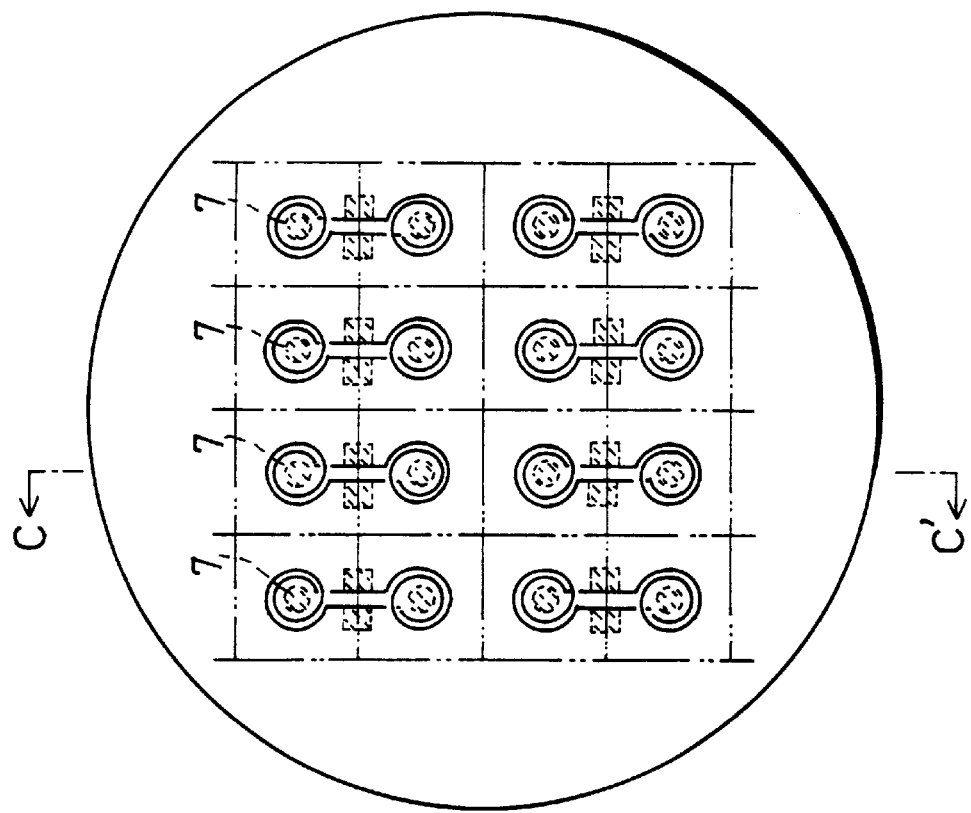

MAGNETO-OPTICAL DEVICE AND RECORDING/REPRODUCING METHOD

FIELD OF THE INVENTION

The present invention relates to a magneto-optical head, magneto-optical device, and magneto-optical recording/reproducing method for use in an external memory device of a computer, etc., and for recording and reproducing of audio and video signals.

BACKGROUND OF THE INVENTION

Actual application of magneto-optical disks, which are one type of magneto- optical recording medium, has been realized as an external memory device of a computer.

The recording density of the magneto-optical disk is limited by the size of a light beam spot on the magneto-optical disk. That is, as the diameter and interval of recording marks become smaller than the size of the light beam spot, the light beam spot would contain plural bits, making it impossible to separately reproduce each recording bit.

The reproducing resolution of a signal is essentially determined by the wavelength $\lambda$ of a light source of a reproducing optical system and by the numerical aperture NA of an objective lens, and the spatial frequency $2NA/\lambda$ sets a limit of reproduction. Thus, to increase recording density, one can take a measure of reducing the light spot diameter of the reproducing device by making the wavelength $\lambda$ of the light source shorter and/or by using a high NA lens.

As such, in recent years, to increase recording density of the magneto-optical disk, research has been made to actually reduce the spot diameter of the reproducing device by reducing the wavelength of the laser light used for recording and reproducing, and/or by using a high NA lens. For example, to reduce the wavelength of a laser light, there is research on a semiconductor blue laser, or research in which the wavelength of a laser light is reduced from around 800 nm to 400 nm with the use of a second harmonic wave generating element (SHG). These research has not reached the stage which can be brought into actual application due to their stability, performance, and cost. However, once realized, it is certain that they will bring higher density recording of information than that offered by the current optical disk systems.

However, the wavelength of a semiconductor laser as currently available in actual application is only around 650 nm.

Further, when a high NA lens is used, the depth of focus is reduced, and high precision is required in the distance between the lens and disk, and it becomes difficult to manufacture the optical disk with precision. For this reason, the NA of the lens cannot be increased substantially, and the lens NA which can be brought into actual application is only around 0.6. Thus, there is a limit in reducing the wavelength of the light source or increasing the NA of the lens, and as it currently stands, it is difficult to effectively increase recording density by these measures.

In view of these drawbacks, for example, Journal of The Magnetics Society of Japan, Vol. 19, Supplement, No. S1 (1995), pp. 421–424 (Document 1) recites a magnetically induced super resolution ("MSR" hereinafter) technique, which is the method for increasing recording density by improving the reproducing resolution with the use of a magneto-optical recording medium which is composed of magnetostatically coupled two magnetic layers and by utilizing a temperature distribution of the light beam spot.

Also, for example, Applied Physics Letter No. 69 (27), Dec. 30, 1996, pp. 4257–4259 (Document 2) recites that information is reproduced while applying an alternating magnetic field to an MSR medium employing magneto-static coupling so that a recording mark is enhanced when transferring the recording mark of the recording layer to the reproducing layer, thus increasing the amplitude of the reproduced signal.

As another method of increasing recording density without reducing the laser wavelength, the numerical aperture (NA) of the optical system is increased. For example, Applied Physics Letter, No. 68(2), Jan. 8, 1996, pp. 141–143 (Document 3) discloses a technique in which an effective NA is increased with the use of a solid immersion lens (SIL) so as to reduce the beam spot.

The following will describe Document 1 in more detail referring to FIG. 13 and FIG. 14.

FIG. 13 shows a representative arrangement of a conventional MSR magneto-optical recording medium. On a transparent substrate 61, there are deposited a transparent dielectric layer 62, reproducing layer 63, transparent dielectric layer 64, recording layer 65, and transparent dielectric layer 66.

The recording layer 65 records magneto-optical information in the form of a change in length of recording marks. However, FIG. 13 and FIG. 14 illustrate an example of only the shortest recording mark. This is because reproduction of the shortest recording mark would automatically allow reproduction of signals of longer recording marks. Thus, it is assumed that the lengths of recording marks are the same, and a region in which the shortest recording mark is to be formed is schematically divided into domains. In the following, each domain will be referred to as a magnetic domain.

Each of magnetic domains A through I records a signal as shown in FIG. 13 and FIG. 14. Even though the reproducing layer 63.is not divided into a plurality of magnetic domains unlike the recording layer 65, for convenience of explanation, (refer to FIGS. 4(a) and 4(b) and FIG. 14), domains of reproducing layer 63 corresponding in position to the magnetic domains A through I of the recording layer 65 are indicated by domains A' through I'.

The following considers the case where laser light is projected on the center of magnetic domain E of the recording layer 65, spreading over the region larger than the magnetic domain E. The temperature distribution of the recording layer 65 would then take the shape in which a high temperature portion (e.g., 150° C.) is found at the site of the recording mark E and the temperature decreases as it moves further from the magnetic domain E. Further, the size of saturation magnetization also takes the distribution which reflects the temperature distribution of the recording layer 65 and it becomes maximum in the magnetic domain E.

Meanwhile, the reproducing layer 63 has in-plane magnetization parallel to the plane of the film (perpendicular to the plane of the paper) at room temperature, and it has a "mask region" from which no signal is reproduced.

By being heated to a high temperature by projection of a laser beam, the magnetization of the reproducing layer 63 becomes smaller and the reproducing layer 63 comes to have perpendicular magnetization, forming an "aperture region" to which the magnetization of the recording layer 65 is transferred by a magneto-static force.

In reproduction, a temperature distribution is generated in the laser spot, and a signal is reproduced only from the aperture region formed at the high temperature portion of the temperature distribution. Namely, by the magnetic flux generated from the magnetic domain E, adjoining portion E' of the reproducing layer 63 is subjected to a force (magneto-static force) which is in accordance with the saturation magnetization of the magnetic domain E, making saturation magnetization of magnetic domains E and E' in line. In this manner, in the transfer of a recording mark of the recording layer 65 to the reproducing layer 63, transfer of a signal to the reproducing layer 63 occurs only at the magnetic domain E, and the recording marks of the other magnetic domains (A through D and F through I) are not transferred and remain as a mask region, thus limiting the signal reproducing region and effectively reducing the reproduced spot.

Thus, even when the recording mark is smaller than the beam spot diameter, information can be read out without interfering with recording marks of adjacent magnetic domains, thus increasing the reproducing resolution of signals and realizing high density recording. Further, because the adjacent tracks at room temperature make up a mask region, a signal leak (cross talk) from adjacent tracks hardly occurs. As a result, the intervals between recording tracks can be reduced.

FIG. 14 describes how this is done in more detail. As the material of the reproducing layer 63 and recording layer 65, an alloy of rare earth metal and transition metal (RE-TM) is used. It is assumed here that an x-y coordinate system is found within a plane parallel to the recording layer 63 and reproducing layer 65, in which the direction of TM magnetization in the plane of the reproducing layer 63 represents y axis, and the direction orthogonal to y axis represents x axis, and the direction which is orthogonal to the both axes x and y and which is in the direction of layer deposition represents z axis. In the recording layer 65, the directions of TM magnetization and saturation magnetization are parallel to z axis, and due to the fact that the composition of the recording layer 65 is TM rich (sub-lattice magnetic moment of the transition metal at room temperature exceeds sub-lattice moment of the rare earth metal), TM magnetization and saturation magnetization direct in the same direction. On the other hand, at a low temperature portion of the reproducing layer 63, the directions of TM magnetization and saturation magnetization are found within the x-y plane, and by the fact that the composition of the reproducing layer 63 is RE rich (sub-lattice magnetic moment of the rare earth metal at room temperature exceeds sub-lattice moment of the transition metal), the saturation magnetization and TM magnetization direct in the opposite directions.

When a laser spot is projected on magnetic domain E in reproduction, by the magnetic flux generated from the magnetic domain E, the saturation magnetization of E' of the reproducing layer 63, which has risen to a high temperature becomes in accordance with the saturation magnetization of magnetic domain E. The site of the reproducing layer 63 other than E' is at a low temperature and the magnetization therein remains in in-plane direction (x-y plane).

Incidentally, in magnetic substances, when magnetization is in close proximity, by the exchange interaction, there arises a force (exchange force) which acts to align the TM magnetization in the same direction. In the reproducing layer 63, each TM magnetization of A' to I' is exchange-coupled with adjacent TM magnetization, and the TM magnetization of E' is exchange-coupled with the TM magnetization of adjacent D' and F'. Namely, the TM magnetization of E' is subject to a force of TM magnetization of D' and F', which force acts to direct the direction of TM magnetization of E' in an in-plane direction. Inversely, the TM magnetization of D' and F' are subject to a force of the TM magnetization of E', which force acts to direct the direction of the TM magnetization of D' and F' in a perpendicular direction. However, the TM magnetization of D' and F' are subject to a force respectively from C' and G', which are adjacent to D' and F' respectively on the other sides of E', which force acts to direct the TM magnetization of D' and F' in an in-plane direction, and because the force is large, the TM magnetization of D' and F' are stably directed in an in-plane direction.

Thus, transfer of a recording mark from the recording layer 65 to reproducing layer 63 occurs at a site where the magneto-static force between the recording layer 65 and reproducing layer 63 exceeds the exchange force within the reproducing layer 63. That is, in this case, the exchange force existing within the reproducing layer 63 acts to reduce the transferred recording mark.

FIG. 15 shows recording mark length dependency of a reproduced signal amplitude when the conventional MSR magneto-optical disk as described above is reproduced by an optical system having a light spot diameter of 0.9 $\mu$m. For comparison, FIG. 15 also shows the result of reproduction with the use of a non-MSR conventional magneto-optical disk. Since reproducing resolution is improved in the MSR magneto-optical disk, a larger reproduced signal amplitude is found with a smaller recording mark as compared with the conventional magneto-optical disk.

However, the prior arts have the following problems.

In the MSR technique as recited in Document 1, to improve reproducing resolution, a mask region is provided over the reproducing layer, and the transferred recording mark is reduced as it is subjected to a force of the mask region which acts to reduce the recording mark. When a small recording mark is reproduced, a reproduced signal amplitude is also reduced, and a sufficient signal amplitude cannot be obtained. This essentially limited the smallest recording mark which could be read out when reproducing the conventional MSR magneto-optical disk, and this limitation prevented improvement of recording density.

Further, when the reproduced signal amplitude is to be made larger, an additional energy, etc., such as application of an alternating magnetic field is required in a reproducing operation as in Document 2, which resulted in increased power consumption.

Further, in the method using SIL as in Document 3, while it is possible to reduce the beam sot diameter, reproducing resolution which exceeds the beam spot diameter cannot be obtained, and even when SIL and MSR technique was combined, the problems still remain that the reproduced signal amplitude is reduced when recording mark is reduced, and that it requires an additional energy to increase the reproduced signal amplitude.

SUMMARY OF THE INVENTION

It is an object of the present invention to provide a magneto-optical head which is capable of increasing recording density by means of preventing a reproduced signal amplitude from being reduced when a recording mark of a magneto-optical recording medium is reduced.

The present invention was accomplished after extensive research by finding that with the use of an SIL which includes an auxiliary lens which is provided with a magnetic layer for transferring information written on the medium by enhancing the information, a recording mark which is even smaller than a beam spot diameter, which was reduced smaller than SIL, can be reproduced without applying a reproducing magnetic field and without reducing the reproduced signal amplitude.

In order to achieve the foregoing object, a magneto-optical head of the present invention for carrying out recording and reproducing on a recording medium having a recording layer which has a maximum value of saturation magnetization between room temperature and a Curie temperature includes: an objective lens for converging light for raising a temperature of the recording layer; an auxiliary lens for projecting the converged light on the recording layer by increasing an effective numerical aperture; and a reproducing magnetic layer, provided on the auxiliary lens, for reproducing information recorded on the recording layer by temporarily enhancing and transferring the information, and the reproducing magnetic layer is provided on a position on which the converged light is projected.

With this arrangement, by setting a spacing between the auxiliary lens and recording layer smaller than a wavelength of light, the light spot which was converged by the objective lens and which was increased in effective numerical aperture by the auxiliary lens is transferred to the recording layer by the near field effect as set above, i.e., projected on the recording layer. Here, compared with the case where the light is converged only by the objective lens, light can be projected on even a smaller area.

Projection of the light causes the recording layer to generate a temperature distribution. As a result, at a portion of the recording layer which exceeds a certain temperature, saturation magnetization becomes larger, and there generates magnetic flux in accordance with pre-recorded information. Here, such a temperature raised portion can be made smaller than a spot diameter of the light with the use of the light of appropriate power. Thus, there generates magnetic flux from saturation magnetization which is directed in accordance with the recorded information over the region of the recording layer smaller than the spot diameter of the light. Therefore, by setting the temperature raised portion to match the area of the recording layer on which the smallest unit of information is recorded ("recording mark" hereinafter), high density magnetic flux which is in accordance with the information from the information of each recording mark can be generated to reach the reproducing magnetic layer.

In the reproducing magnetic layer having an appropriate area, the directions of saturation magnetization are aligned over the entire reproducing magnetic layer in accordance with the magnetic flux. Thus, by increasing the area of the reproducing magnetic layer larger than the area of the recording mark, the information recorded on the recording mark can be transferred to the reproducing magnetic layer by being enhanced.

Meanwhile, by the reproducing magnetic layer which is provided on the position of the light spot, there generates reflected light by projection of the light. The reflected light is rotated in the direction of the polarization direction with respect to incident light by the effect of the directions of the saturation magnetization of the reproducing magnetic layer, and a reproduced signal is generated based on this rotation in the polarization direction. Here, because the magnetization transferred on the reproducing magnetic layer is enhanced, the quantity of the light which was rotated in polarization direction (Kerr rotation), i.e., which contains information, becomes larger than the case in which reflected light is utilized directly from the recording mark, thus increasing a reproduced signal amplitude.

In this manner, the reproduced signal amplitude is prevented from being reduced even when the recording mark is made smaller, thus making it possible to increase recording density while maintaining a large reproduced signal amplitude.

As a result, with the described arrangement, it is possible to read out a recording medium which records information in high density by the reduced recording mark, thus realizing higher density recording of information than the conventional art.

A magneto-optical device of the present invention includes the magneto-optical head as described above.

With the above arrangement, information can be recorded and reproduced in high density with respect to a recording medium, which allows the use of a higher density recording medium than the conventional medium, thus increasing the amount of information per recording medium to be inserted in the device. As a result, it is possible to reduce the size of the recording medium and the magneto-optical device to which the recording medium is to be inserted, and the number of recording medium used can be reduced as well.

Further, with the described arrangement, high density recording of information is realized without requiring application of an external magnetic field, and thus compared with the conventional magneto-optical device which realizes high density recording and reproducing by the method accompanying application of an external magnetic field in reproduction, power consumption can be reduced.

The method of the present invention for magneto-optically recording and reproducing information using a magneto-optical head for carrying out recording and reproducing on a recording medium having a recording layer which has a maximum value of saturation magnetization between room temperature and a Curie temperature includes: an objective lens for converging light for raising a temperature of the recording layer; an auxiliary lens for projecting the converged light on the recording layer by increasing an effective numerical aperture; and a reproducing magnetic layer, provided on the auxiliary lens, for reproducing information recorded on the recording layer by temporarily enhancing and transferring the information, the reproducing magnetic layer being provided on a position on which the converged light is projected, wherein, in reproducing, light is projected on the recording layer via the reproducing magnetic layer provided on the auxiliary lens, and information recorded on the recording layer is transferred to the reproducing magnetic layer by magnetic flux generated from the recording layer so as to reproduce the information using reflected light from the reproducing magnetic layer, and in recording, light is projected on the recording layer by varying an energy of the light from that used in reproducing, and an external magnetic field based on information to be recorded is applied so as to record the information on the recording layer.

With this method, by varying the light energy between reproducing and recording, specifically, by projecting the light of higher energy in recording than in reproducing, the recording layer of the recording medium is heated to a temperature in the vicinity of the Curie temperature, and by applying an external magnetic field to a portion where the coercive force has decreased, information can be recorded in high density using a single magneto-optical head. As a result, it is possible to provide a magneto-optical device having a simple structure, which can be easily switched between recording and reproducing operations.

In order to achieve the foregoing object, the magneto-optical head of the present invention includes: an objective lens for converging light on a recording layer of a recording medium; an auxiliary lens for allowing the light to travel toward the recording layer by a near field effect by increasing a numerical aperture of the objective lens; and a reproducing magnetic layer for reproducing information of a recording mark by enhancing and transferring magnetic flux which was generated only from a single recording mark of the recording layer by heat of the light fallen on the recording layer, and the reproducing magnetic layer is provided on a side of the auxiliary lens toward which the light travels.

With this arrangement, provided that the recording layer recording information as magnetization within the recording medium is positioned sufficiently close to the transparent element, when the light incident from the side of the lens element is converged on the reproducing magnetic layer in the vicinity of the surface of the transparent element on the side of the recording medium, the light is also transferred to the recording layer by the near field effect. The recording layer, having received the light, is heated and comes to have saturation magnetization in accordance with recorded magnetization.

Here, when the light energy is appropriate, the recording layer can be heated only in the vicinity of a portion of a single recording mark of the recording layer, thus generating strong saturation magnetization of a single recording mark. The magnetic flux generated from the saturation magnetization is enhanced and transferred to the reproducing magnetic layer having a wider area than that of the recording mark. The reproducing magnetic layer is irradiated by the light, and generates a reproduced signal using the reflected light which was subjected to the effect of enhanced and transferred magnetization.

Because the magnetization contributing to the reproduced signal is enhanced from the magnetization of the recording medium, the reproduced signal amplitude can be made larger. That is, even when the magnetization recorded on the recording medium is made smaller, the reproduced signal amplitude can be prevented from being reduced, thus realizing high density recording of information on the recording medium.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a graph showing a reproduced signal amplitude in accordance with one embodiment of the present invention.

FIG. 10(a) is a plane view showing another manufacturing method of the magneto-optical head, and FIG. 10(b) is a cross sectional view of FIG. 10(a) taken along the line C–C'.

DESCRIPTION OF THE EMBODIMENTS

The following will describe one embodiment of the present invention referring to FIG. 1 through FIG. 12. Note that the description will be given in the following order.

Figure 1:
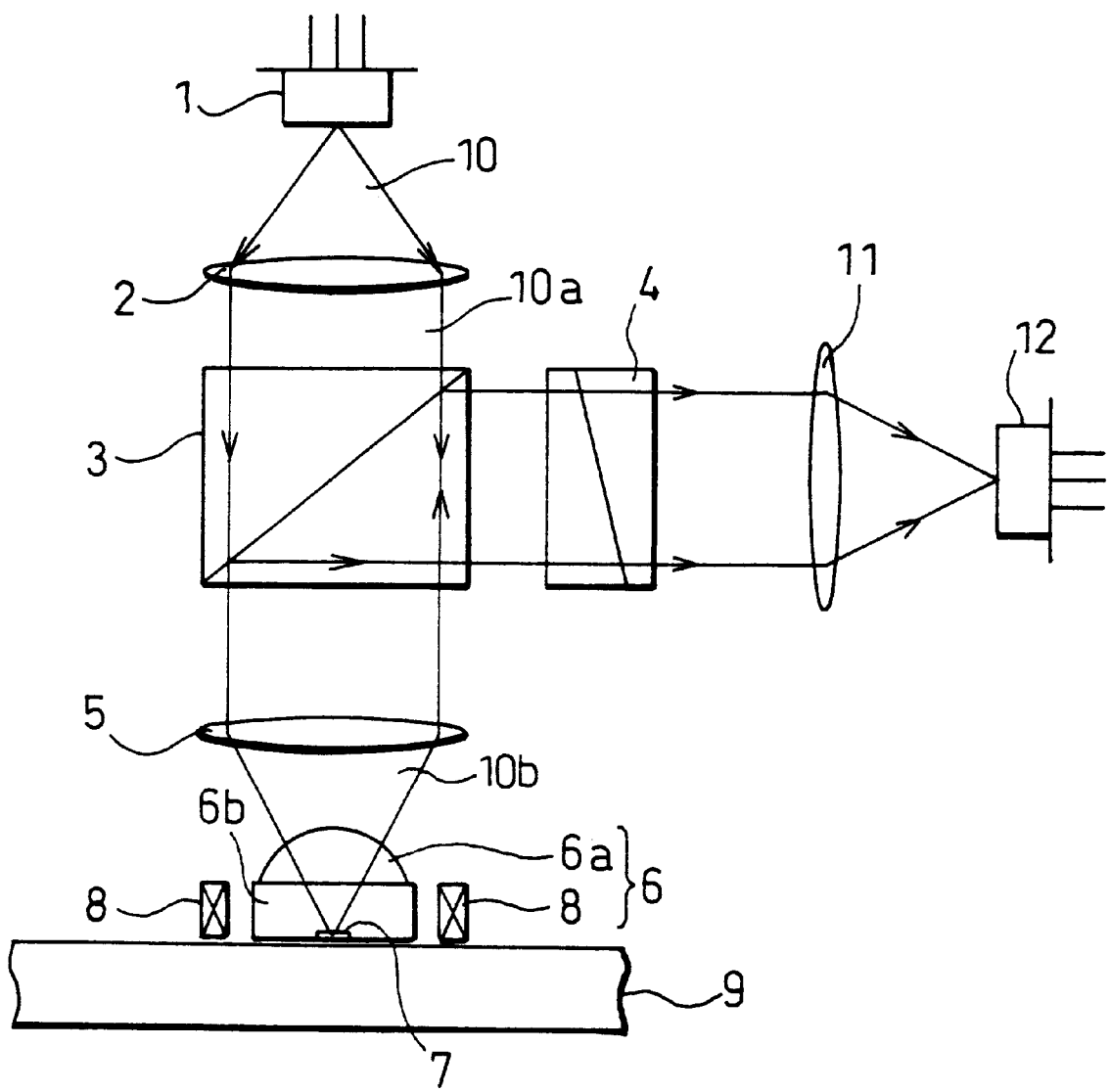
FIG. 1 is a concept view of a magneto-optical device in accordance with one embodiment of the present invention.

① Basic Device Structure
② MSR SIL
③ Recording Medium and MSR Reproducing Mechanism
④ Tracking Method and Focusing Method ① Basic Device Structure FIG. 1 is a drawing which shows an optical system of an MSR magneto-optical recording/reproducing device (magneto-optical device) in accordance with the present embodiment. Light ray 10 having a wavelength of 635 nm, which was emitted from a laser diode (LD) (light source) 1 is linearly polarized in a direction of the plane of the paper, and it is converted to parallel rays 10a by a collimator lens 2. The parallel rays 10a having passed through a polarized beam splitter (PBS) 3 are converged by an objective lens (optical system) 5 of NA=0.6 to be a light beam (light) 10b. Between a recording medium 9 and the objective lens 5 is provided an auxiliary lens 6, and the light beam 10b is converged on the plane of the auxiliary lens 6 on the side of the recording medium 9.

The auxiliary lens 6 is composed of a spherical lens (lens element, optical system) 6a and a transparent element 6b which is provided with a reproducing magnetic layer 7, wherein the spherical lens 6a and reproducing magnetic layer 7 are pasted with each other. Also, the auxiliary lens 6 is provided such that the focusing point of the objective lens 5 is on the spherical center of the spherical lens 6a.

The auxiliary lens 6 and recording medium 9 are provided to have a fine spacing therebetween, and the spacing is set to be sufficiently small, e.g., around 100 nm, and thus by converging light on the plane of the auxiliary lens 6 on the side of the recording medium 9 in the described manner, the light is also converged on the recording medium 9 by the near field effect. Therefore, the light beam 10b projected would have a beam spot diameter ø, which is 1/n (where n is a refractive index of auxiliary lens 6) of the beam spot diameter ø which would have been obtained had the recording medium 9 was not provided with the auxiliary lens 6.

Around the auxiliary lens 6 is provided a recording coil 8. When the device is for reproducing only, the coil 8 is not required.

The light reflected at the reproducing magnetic layer 7 or recording medium 9, after being converted to parallel rays by passing through the objective lens 5, is reflected by the PBS 3 and enters a Wollaston prism (analyzer) 4 and is converged on a photodetector 12 by a multi lens 11.

As described, the magneto-optical recording/reproducing device of the present embodiment has a magneto-optical composite head on one side of the recording medium, wherein the magneto-optical head is composed of auxiliary lens 6 and recording coil 8, etc.

② MSR SIL (Solid Immersion Lens)

Figure 2:
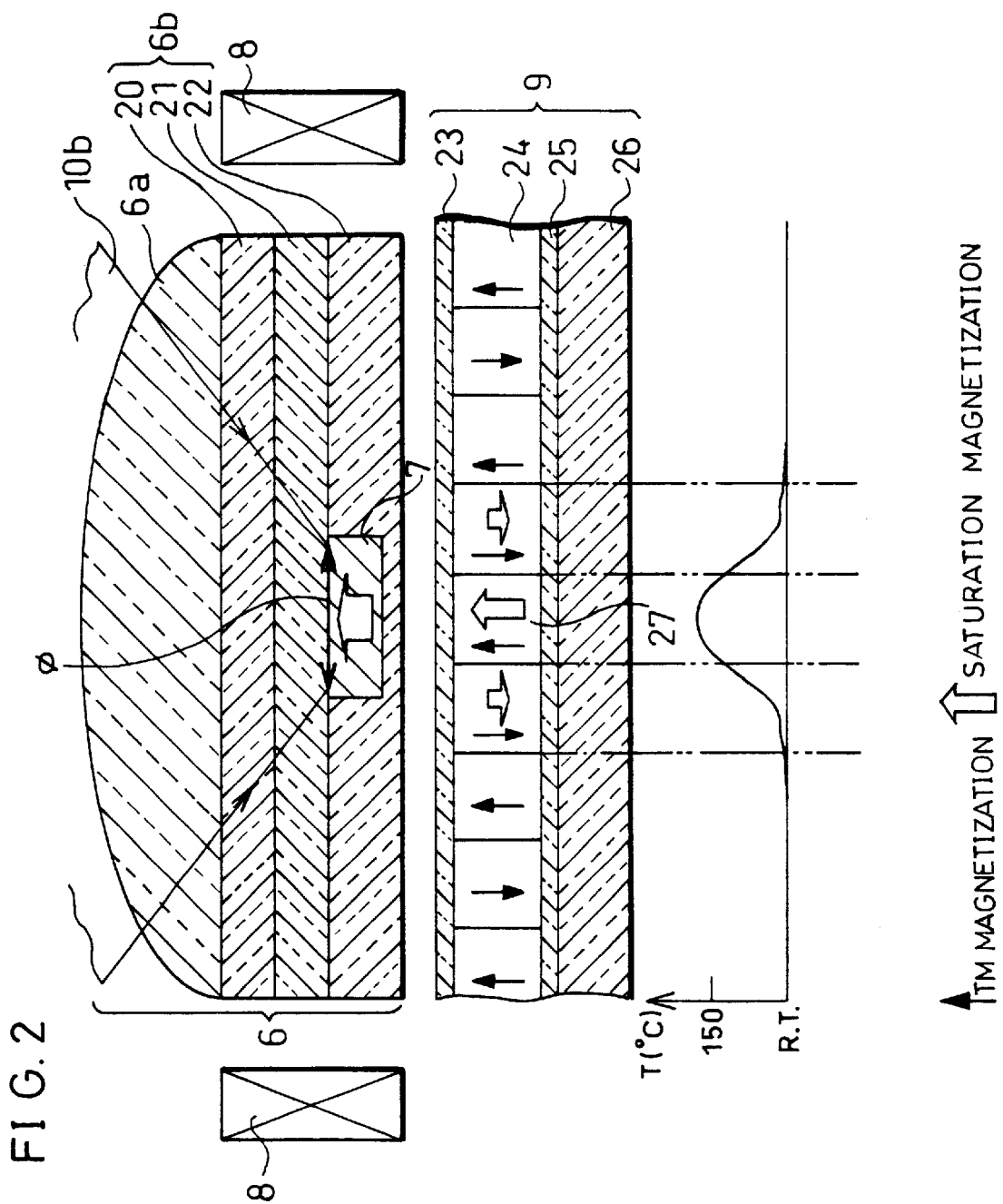
FIG. 2 is a schematic drawing of a magneto-optical head and recording medium in accordance with one embodiment of the present invention, and also is a graph showing a temperature distribution of a recording layer.

FIG. 2 is a magnified view of the recording medium 9 and auxiliary lens 6 of FIG. 1. The auxiliary lens 6 includes spherical lens 6a and transparent element 6b which is provided with reproducing magnetic layer 7, wherein the spherical lens 6a and reproducing magnetic layer 7 are pasted with each other. The spherical lens 6a is in the form of an incomplete sphere (e.g., hemisphere) of appropriate radius r (e.g., r=0.5 mm), and is made of a material having a high refractive index (e.g., refractive index n=1.5). The transparent element 6b is a flat plate having opposing parallel planes, and has a structure in which a transparent dielectric medium 21, reproducing magnetic layer 7, and transparent dielectric medium 22 are deposited on a transparent substrate 20 which is made of a material having almost the same refractive index as that of the spherical lens 6a. The reproducing magnetic layer 7 is made to have an area which is slightly larger than the beam spot diameter ø, and the reproducing magnetic layer 7 is set to be on the focusing point of the objective lens 5, i.e., on the focusing point of the light by the auxiliary lens 6. The transparent dielectric media 21 and 22 are provided over the entire surface of the transparent element 6b on the other side of the recording medium 9.

Note that, the spherical lens 6a as an integral unit with the transparent element 6b constitutes the auxiliary lens 6 as a solid immersion lens (SIL).

As described, in the present embodiment, the device can be made smaller by the integral unit of MSR SIL which is composed of spherical lens 6a, transparent substrate 20, transparent dielectric media 21 and 22, and reproducing magnetic layer 7.

In this manner, the magneto-optical head of the present invention includes auxiliary lens 6, which is preferably composed of transparent element 6b including reproducing magnetic layer 7, and spherical lens 6a having nearly the same refractive index as that of transparent element 6b, wherein the transparent element 6b and spherical lens 6a are pasted with each other.

With this arrangement, unwanted reflection at the auxiliary lens 6, due to a change in refractive index can be prevented, allowing efficient use of the light emitted from the objective lens 5, and it is possible to prevent adverse effect of a noise as caused by stray light, thus obtaining a stable reproducing signal. Further, with this arrangement employing pasting of elements, the number of manufacturing steps and also manufacturing cost can be reduced.

③ Recording Medium and MSR Reproducing Mechanism

The following will describe, referring to FIG. 2, a structure of a recording medium and an MSR reproducing mechanism which are preferably used in the present embodiment.

The recording medium 9 has an arrangement in which a transparent dielectric layer 25, recording layer 24, and transparent dielectric layer 23 are deposited on a glass or plastic substrate 26. Recording is made on the recording layer 24, as indicated by the black arrow, and each region confining the black arrow makes up a magnetic domain (portion which is schematically parted to include the shortest recording mark).

The recording layer 24 employs TbFeCo, which is widely used in magneto-optical recording media. TbFeCo is an amorphous alloy of FeCo as a transition metal ("TM" hereinafter) and Tb as a rare earth metal ("RE" hereinafter). Further, TbFeCo is a ferri magnetic material in which TM magnetization and RE magnetization are coupled anti-parallel to each other (directions of respective sub-lattice magnetization are opposite). In FIG. 2, black arrow indicates TM magnetization, and blank arrow indicates saturation magnetization Ms, which is the difference of TM magnetization and RE magnetization. Note that, in a ferro magnetic material such as NdFeCo, the magnetization of each atom is coupled in parallel.

Figure 3:
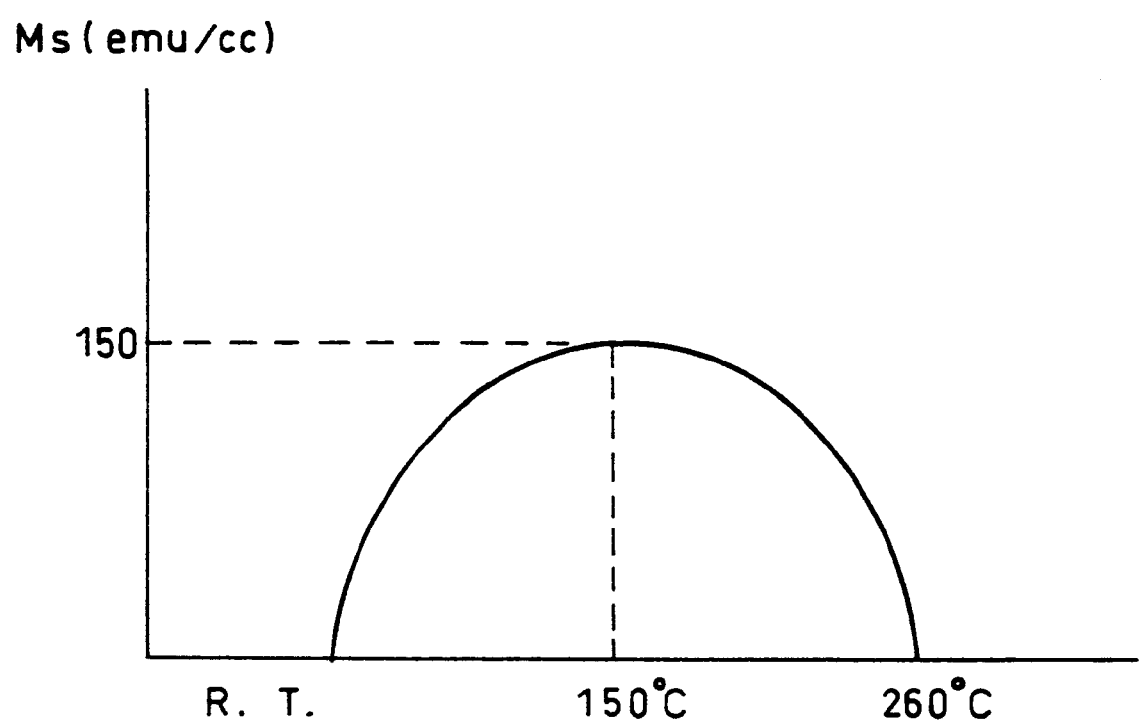
FIG. 3 is a graph showing magnetic characteristics of the recording medium in accordance with one embodiment of the present invention.
Figure 4:
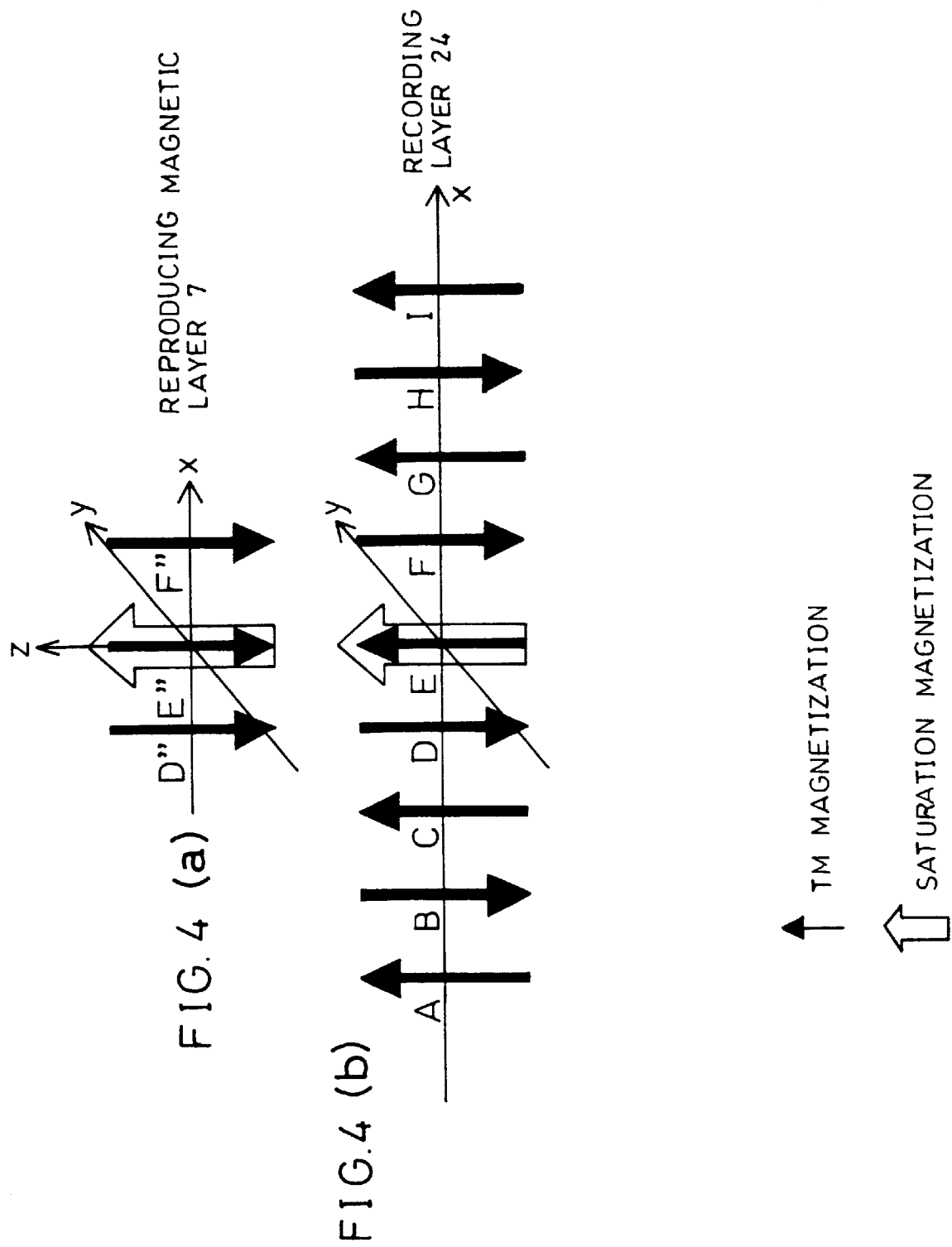
FIG. 4(a) is a schematic drawing showing magnetization of a reproducing magnetic layer in accordance with one embodiment of the present invention.
FIG. 4(b) is a schematic drawing showing magnetization of the recording layer.

The TbFeCo as used herein has temperature dependency for saturation magnetization Ms as shown in FIG. 3. Since room temperature (R.T.) makes up the compensation temperature, saturation magnetization Ms at room temperature is 0. As the term is used herein, compensation temperature refers to a temperature at which intensities of RE sub-lattice magnetization and TM sub-lattice magnetization become equal, and thus it is the temperature at which the apparent saturation magnetization Ms becomes 0, and the intensities of RE sub-lattice magnetization and TM sub-lattice magnetization are reversed at the temperatures around the compensation temperature. Further, in TbFeCo, saturation magnetization Ms takes the maximum value at 150° C., and the Curie temperature (temperature at which magnetization disappears) occurs at 260° C.

In reproduction, irradiation of recording layer 24 through reproducing magnetic layer 7 by the light beam 10b causes the reproducing layer 24 to generate a temperature distribution as shown in FIG. 2. With the use of a reproducing laser power which would make a portion having the highest temperature in the recording layer 24 to have a temperature of around 150° C. in reproduction, as shown in FIG. 2, the temperature raised portion of the recording layer 24 comes to have large saturation magnetization Ms, whereas in a region of lower temperature, saturation magnetization Ms becomes smaller and reaches 0 at around room temperature.

In recording layer 24, a temperature raised portion can be made smaller than the beam spot diameter ø, and the saturation magnetization Ms which occurs in the temperature raised portion generates magnetic flux. As a result, the information of saturation magnetization Ms, in the region of the recording layer 24 which is smaller than the beam spot diameter ø is transferred as magnetic flux to the reproducing magnetic layer 7.

Figure 13:
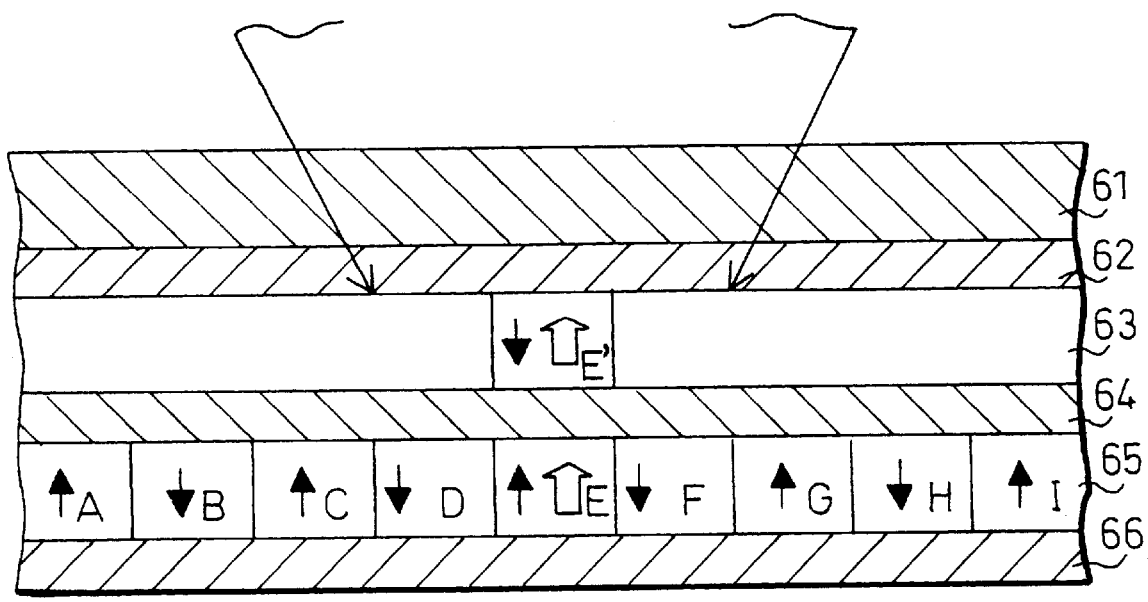
FIG. 13 is a schematic drawing showing a conventional MSR magneto-optical recording medium.

Here, the reproducing magnetic layer 7 has the same property as that of the reproducing layer 63 (see FIG. 13). Namely, the reproducing magnetic layer 7 is made of an alloy of rare earth metal and transition metal (RE-TM). Further, in the low temperature (room temperature) portion of the reproducing magnetic layer 7, TM magnetization and saturation magnetization are directed within the plane of the reproducing magnetic layer 7, and because the composition of the reproducing magnetic layer 7 is RE rich (sub-lattice magnetic moment of rare earth metal at room temperature exceeds sub-lattice magnetic moment of transition metal), saturation magnetization and TM magnetization are found in opposite directions. The directions of saturation magnetization are aligned in accordance with the magnetic flux from the recording layer 24 by being heated by a light beam.

Further, the diameter of the reproducing magnetic layer 7 is larger than the beam spot diameter ø. Since the directions of magnetization of the reproducing magnetic layer 7 are aligned over the entire layer in accordance with the magnetic flux from the recording layer 24, the information of recording mark 27 is transferred to the region which is larger than the beam spot diameter ø, and the region plays a part in reproduction, thus ensuring that the amplitude of a reproduced signal is not reduced even when the recording mark 27 is reduced, thereby improving recording density.

As described, the magneto-optical head of the present invention includes reproducing magnetic layer 7 which is preferably provided to be larger than the recording mark 27 recorded on the recording medium 9.

With this arrangement, the directions of magnetization in an area larger than recording mark 27 are aligned in accordance with the magnetic flux from the recording mark 27, thus increasing the area of a region which reflects incident light by rotating the polarization direction of the light in accordance with the information of the recording mark 27. As a result, the quantity of the reflected light containing information of the recording mark 27 is increased, and the reproduced signal amplitude can be made larger, thus realizing stable reproduction even when recording mark 27 is reduced.

Figure 14:
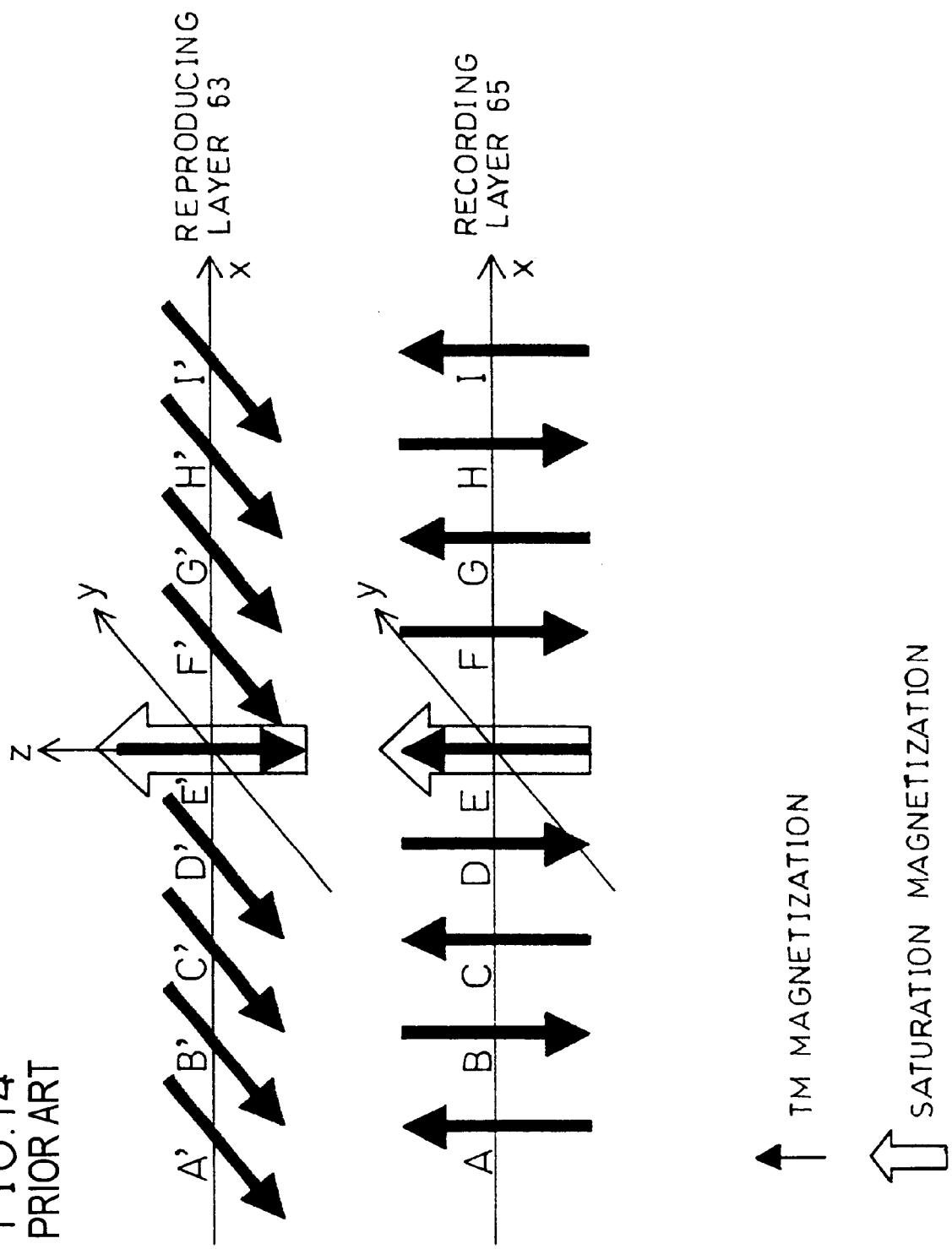
FIG. 14 is a schematic view showing magnetization of the conventional MSR magneto-optical recording medium.
Figure 15:
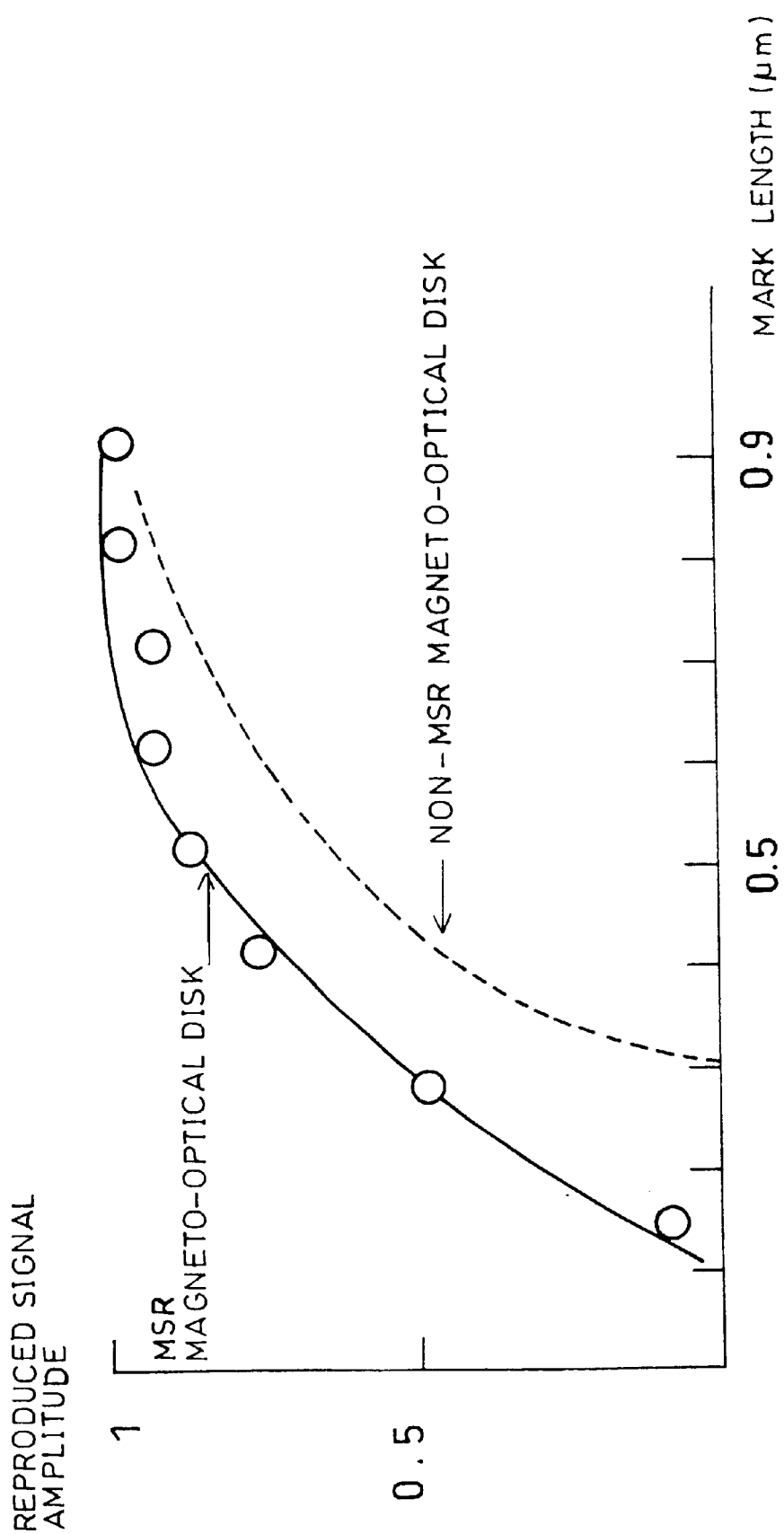
FIG. 15 is a graph showing reproduced signal amplitudes of a conventional MSR magneto-optical disk and non-MSR magneto-optical disk.

The following will describe the reason for making the area of the reproducing magnetic layer 7 larger than the area of the recording mark 27, and, also, referring to FIGS. 4(a) and 4(b) and FIG. 14, the reason why the reproducing magnetic layer 7 is aligned altogether in accordance with the magnetic flux from the recording layer 24. The problems associated with reproduction in a conventional MSR magneto-optical recording medium are as described above with reference to FIG. 13 and FIG. 14.

Considering the case where the area of the reproducing layer 63 as shown in FIG. 14 is reduced to the size nearly the same as the beam spot diameter ø as shown in FIG. 4(a), it can be seen that the area of the reproducing magnetic layer 7 is reduced to the size of substantially the beam spot diameter ø as compared with FIG. 14 (area of reproducing magnetic layer 7 is nearly equal to the area of the light spot of the converged light), and FIG. 4(a) shows that only D", E", and F" exist as TM magnetization. The saturation magnetization of E" is in accordance with the magnetic flux from the saturation magnetization of magnetic domain E of FIG. 4(b), as with FIG. 14. However, while the TM magnetization of D" and F" is subject to the exchange force from E" to be directed in a perpendicular direction, since there exist no magnetic domains C' and G', there is no force which acts to direct the TM magnetization of D" and F" in an in-plane direction. Thus, the TM magnetization of D" and F" is directed in a perpendicular direction by the exchange force from the TM magnetization of E".

In this manner, by sufficiently reducing the area of reproducing magnetic layer 7 to the size near the beam spot diameter ø, it is possible to have an effect of magnifying and transferring the recording mark of the recording layer 24 over the entire layer of the reproducing magnetic layer 7.

④ Tracking Method and Focusing Method

Figure 5:
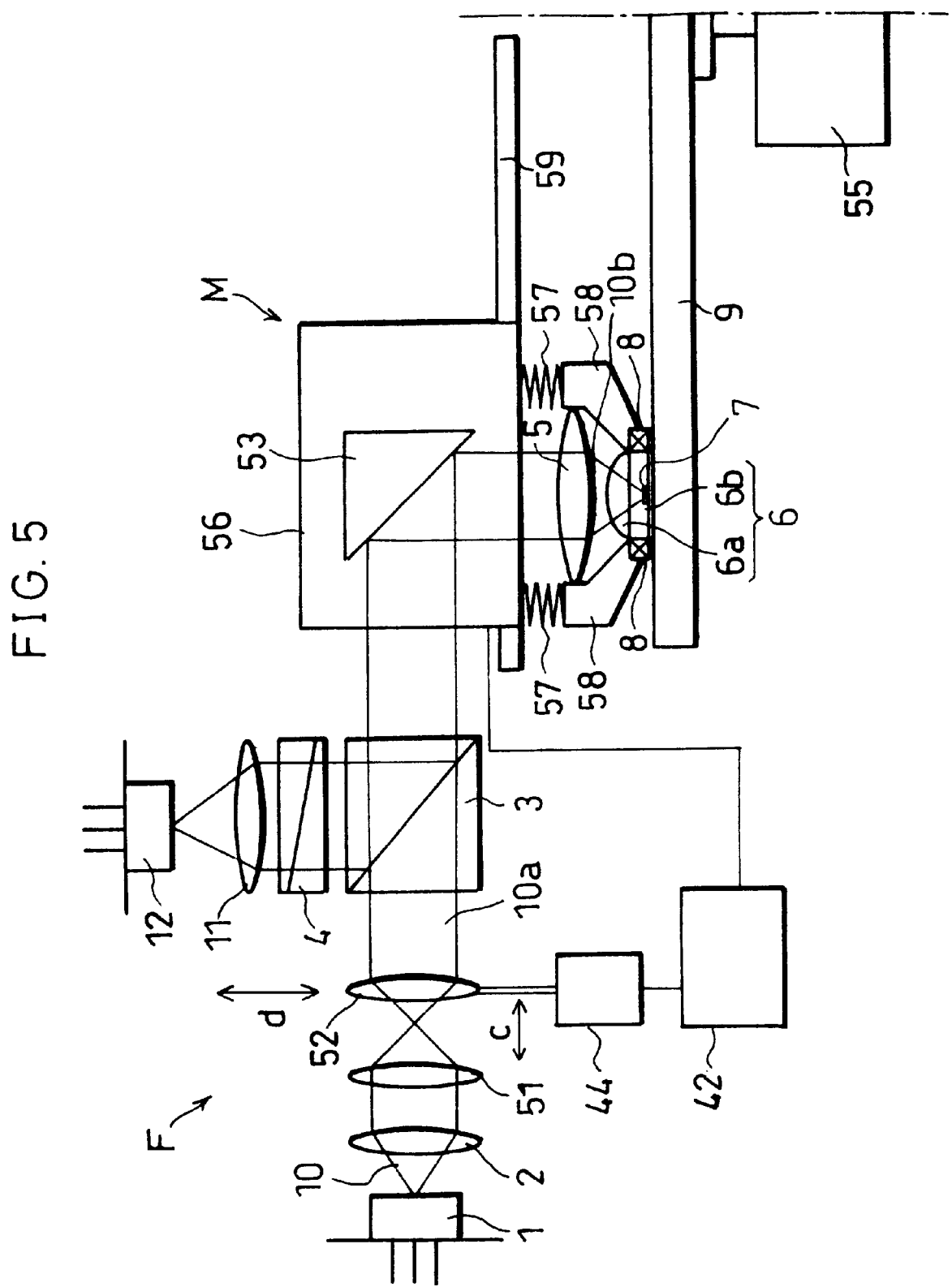
FIG. 5 is a drawing showing an arrangement of the magneto-optical device.

FIG. 5 is a schematic diagram of a device used for the experiment of recording and reproducing.

Light ray 10 from laser diode (light source) 1 reaches the recording layer 24 (see FIG. 2) of the recording medium 9 by travelling through collimator lens 2, relay lenses 51 and 52, PBS 3, stand-up mirror 53, objective lens 5, and auxiliary lens 6. The recording layer 24 of the recording medium 9 is provided more toward the upper surf ace of the recording medium 9 (toward the side where auxiliary lens 6 is provided) so as to allow the magneto-optical head to carry out recording and reproducing of information more effectively.

The light reflected at the reproducing magnetic layer 7 and the recording medium 9 is incident on the Wollaston prism 4 through PBS 3. By the polarization splitting effect of the Wollaston prism 4, the reflected light from the recording medium 9 is separated into two polarization components (P polarized light and S polarized light) which oscillate orthogonal to each other, and thus the Wollaston prism 4 acts as an analyzer. The two polarization components emerge from the Wollaston prism 4 at a separation angle (1 to several degree with the wavelength of LD of 635 nm). The reflected light emerged from the Wollaston prism 4 then passes through the multi lens 11 having a sufficiently wide incident plane with respect to the light beam, and the two light beams, while being converged, are incident on a photodetector 12 which is divided into two sections, respectively corresponding to the two light beams.

By the magnetization of the reproducing magnetic layer 7, which was magnified and transferred from the magneto-optical signal recorded on the recording layer 24 (see FIG. 2) of the recording medium 9, the polarization plane of the reflected light is rotated with respect to the polarization plane of the incident light. By this effect, there occurs a change in light intensity of the orthogonal two polarization components of the reflected light, and accordingly there occurs a change in output of the two light receiving sections of the photodetector 12. Magneto-optically recorded information can be reproduced by measuring this change in output.

Note that, the above described the case where the Wollaston prism 4 splits light into two polarization components. However, the light may be split into three light beams of P polarized light, S polarized light, and P+S polarized light, whereby the P+S polarization component may be used for focusing control. Further, the photodetector 12 may be divided into two or more light receiving sections for the purpose of tracking control and focusing control.

The recording medium 9 is rotated by a spindle motor 55, and the direction of the rotation is perpendicular to the plane of the paper. Table 56 mounting the stand-up mirror 53, and support cylinder 58 securing objective lens 5 and auxiliary lens 6 are linked to each other by spring (gimbal) 57, and the auxiliary lens 6 travels over the recording medium 9, floating thereon. The angle of objective lens 5 is adjusted such that the parallel rays 10a are converged on the reproducing magnetic layer 7 of the auxiliary lens 6 when incident on the objective lens 5, and the angle thus adjusted is fixed by the support cylinder 58. The table 56 mounting the stand-up mirror 53 is moved in the radial direction of the disk (recording medium 9) by a shaft 59.

As described, the optical system of the present embodiment is composed of (A) fixed optical system F which includes light source (LD) 1, PBS 3, Wollaston prism 4, and photodetector 12, etc., and (B) mobile optical system M which includes stand-up mirror 53 provided on table 56, objective lens 5, and auxiliary lens 6, etc.

The following will describe a tracking operation of the device.

When eccentricity of the recording medium 9 is large, in an order of several microns, and when the moving track distance in the track jump operation is large, first, the table 56 mounting the stand-up mirror 53 is moved along the shaft 59. After this rough control, the support cylinder S8 is driven by an actuator (not shown) to accurately control the position of light beam 10b on the recording medium 9.

On the other hand, when the eccentricity of the recording medium 9 is notably small (e.g., 1 micron or less), and when the moving track distance in the track jump operation is large, tracking may be carried out first by moving the table 56 mounting the stand-up mirror 53 along the shaft 99, and thereafter by driving the relay lens 52 by an actuator (driving means) 44 so as to control the relay lens 52 in a direction of the arrow d (parallel to the plane of the paper). This method has the advantage of speed over the case where tracking control is carried out by driving by the actuator (not shown) the support cylinder 58 on which the objective lens 5, auxiliary lens 6, and recording coil 8 are fixed because the only driving load in this method is the relay lens 52.

However, here, one caution must be taken. As noted above, when the projection area of the beam is off the reproducing magnetic layer 7, the quantity of reflected light is reduced, and thus the range in which the beam spot position of the light beam 10b can be changed by driving the relay lens 52 is limited within the domain of the reproducing magnetic layer 7.

Meanwhile, when the eccentricity of the recording medium 9 is notably small, and when the moving track distance in the track jump operation is small (over several tracks), or in the case of continuous tracking of the tracks currently being scanned (i.e., tracking), only the driving of relay lens 52 is carried out.

In either case, whether to drive the support cylinder 58, or to drive the relay lens 52 is determined based on the eccentricity of the recording medium 9 to be used.

Note that, in the above description, tracking control is made by moving the relay lens 52. However, the same effect can be obtained by moving the collimator lens 2 in a direction of the arrow d in FIG. 5. In such a case, the relay lenses 51 and 52 are not particularly required. However, when focusing and tracking control are to be carried out by moving the collimator lens 2, a difficulty arises in alignment of the other optical system. Thus, in the present embodiment, after collimating the diffused light from the LD 1 by the collimator lens 2, the positioning relationship of the two is fixed by an adhesive, etc., and the position adjustment of various optical systems is made with the use of the collimated light, and focusing and tracking control are carried out by the positioning control of the relay lens 52.

Further, even though focusing is in principle not required, it is carried out nonetheless to compensate for waving of the substrate of the transparent element 6b by moving the relay lens 52 in a direction of the arrow c (parallel to optical axis). That is, when the relay lens 52 is at a ready position, the light emerging from the relay lens 52 takes the form of collimated light, and it is focused on a predetermined focusing point by the objective lens 5 and relay lens 6. Meanwhile, when the relay lens 52 is moved back and forth from the ready position, the light emerging from the relay lens 52 takes the form of converged light or diffused light, and accordingly the focusing point of the light by the objective lens 9 and auxiliary lens 6 is shifted from the predetermined position in respective directions. Focusing control is carried out by this operation.

In this manner, by separating the optical system to reduce the weight of the mobile optical system, fast mobility can be realized while maintaining the required moving distance.

The various types of described control are carried out by a controller (control means) 42. A control program is stored beforehand in a non-volatile memory, etc.

As described, the magneto-optical device of the present invention preferably includes: a mobile optical system M which includes the described magneto-optical head; a fixed optical system F which includes a laser diode 1 for emitting light, a relay lens 52 provided on an optical axis, an actuator 44 for changing a position of the relay lens 52 with respect to the optical axis, and a photodetector 12 for receiving reflected light which includes information which is generated from projection of the light on the recording layer 24; and a controller 42 for controlling a projection position of the light on the recording medium 9, in which the controller carries out positional control of the relay lens 52 by driving the actuator 44 when a target position of the light is within a domain of the reproducing magnetic layer 7, and the controller carries out positional control of the mobile optical system M when a target position of the light is outside of the domain of the reproducing magnetic layer 7.

With this arrangement, when the distance of the projection position to be moved is relatively small, the projection position is moved only by moving the relay lens 52, by which a less load is put on the actuator 44 and fast control is realized. On the other hand, when the distance of the projection position to be moved is relatively large, positional control is carried out by the mobile optical system M, by which a reduction in reproduced signal amplitude due to deviation of the light off the reproducing magnetic layer 7 can be prevented.

As described, with the use of the MSR SIL of the present embodiment, the recording mark of the recording layer (see FIG. 2) can be transferred to the reproducing magnetic layer 7 upon magnification, and thus it is possible to prevent the amplitude of a reproduced signal from being reduced even when reproducing a small recording mark. As a result, high density recording and reproducing can be realized.

Though omitted in the described embodiment, the reproducing magnetic layer 7 of the auxiliary lens 6, and the transparent dielectric media 21 and 22 are designed with a material and thickness which would increase the Kerr rotation angle of the reproduced light, and they are selected to bring the recording layer 24 and reproducing magnetic layer 7 as close as possible so that the magnetic flux generated from the recording layer 24 is easily transferred. However, in accordance with the present invention, the material and thickness of these elements are not just limited to the specified ones used in the present embodiment.

Further, recording of information can be made by inputting a modulation signal based on the information to the coil 8 simultaneously with the laser projection. This method is equivalent to the conventional recording method on the magneto-optical disk. Specifically, recording is made by projecting light ray 10 from the light source 1 on the recording medium 9 through the auxiliary lens 6 to raise the temperature of the recording layer 24 to the temperature in the vicinity of the Curie temperature, and by applying an external magnetic field by the coil 8 to the portion of the recording layer at which the coercive force has decreased.

As described, the magneto-optical head of the present invention preferably includes a coil 8 which generates, at the time of recording information, magnetic flux which is in accordance with information to be recorded, and which is provided around the auxiliary lens 6.

With this arrangement, recording (writing) of information on the recording medium 9 can be made by applying a magnetic field of a direction in accordance with the information to be recorded with the use of the coil 8, wherein the magnetic field is applied under the condition where the temperature of a portion of the recording layer 24, which portion is to include a recording mark is raised to a temperature at which the coercive force is sufficiently reduced by increasing the energy of the light to be projected on the recording layer 24. As a result, recording and reproducing of information can be made with higher density than the conventional example with the use of a single magneto-optical head.

EXAMPLE 1

Figure 6:
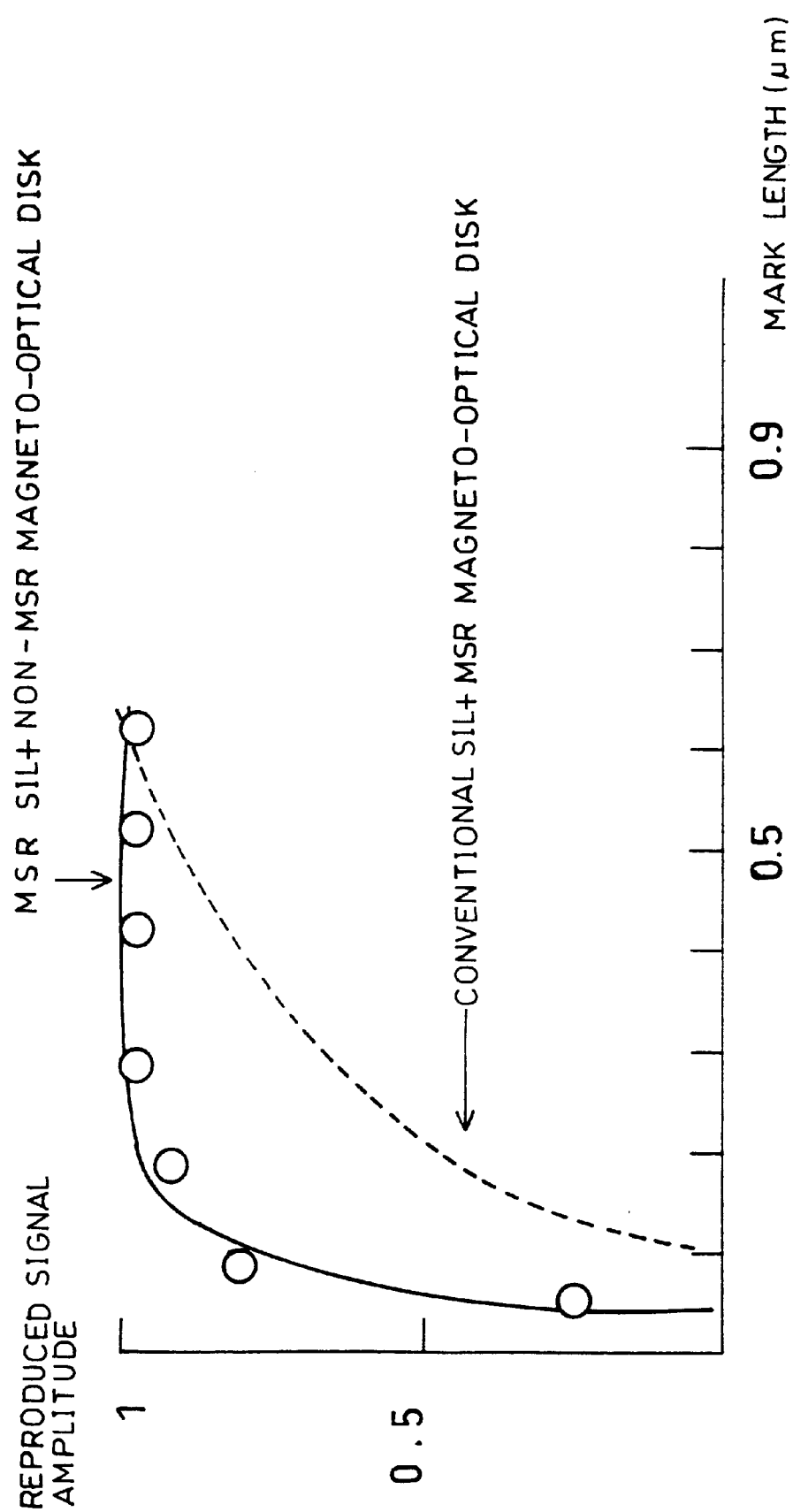
FIG. 6 is a graph showing a comparison of reproduced signal amplitudes between one embodiment of the present invention and the prior art.

FIG. 6 shows a relationship between reproduced signal amplitude and mark length of a recording mark, which compares the case where an MSR recording medium 9' (see FIG. 12 to be mentioned later) is reproduced by the conventional SIL and the case where an MSR recording medium 9 is reproduced by a non-MSR SIL utilizing MSR of the present invention.

In both cases, the beam spot diameter ø is 0.6 µm, and the diameter of the reproducing magnetic layer 7 (see FIG. 2) of the MSR SIL is 0.8 µm. The reproduced signal amplitude is normalized by the amplitude which was used to reproduce the recording mark of 0.6 µm. It can be seen that with the use of the MSR SIL of the present invention, smaller recording marks can be reproduced.

Figure 11:
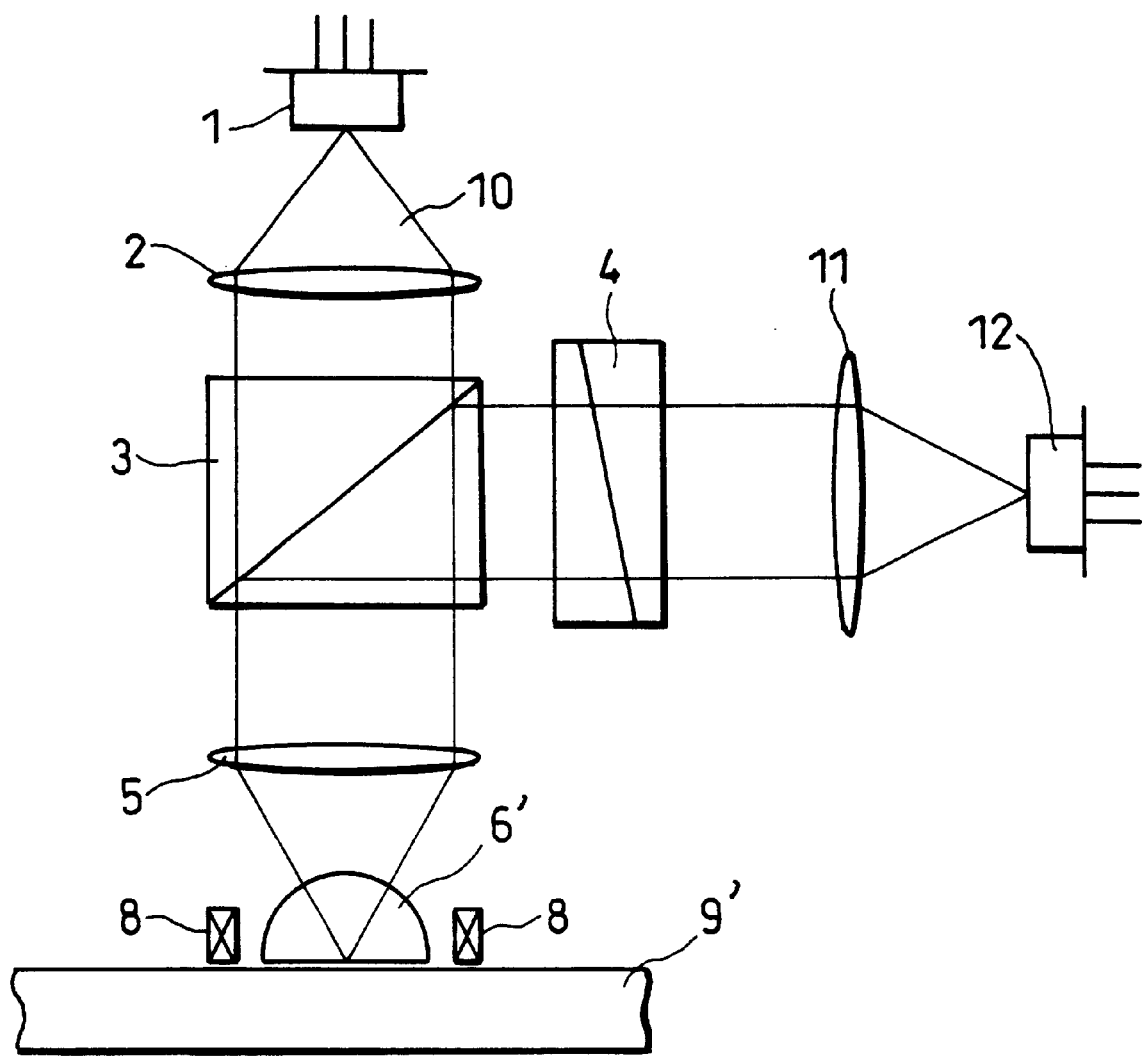
FIG. 11 is a concept view of a comparative magneto-optical device.

Note that, the conventional SIL optical system as used in this comparison is as shown in FIG. 11, and except for the auxiliary lens 6', which is not provided with the reproducing magnetic layer 7, the arrangement thereof is the same as that of FIG. 1. Also, the other optical elements used are also the same as those shown in FIG. 1 and they are given the same reference numerals.

Figure 12:
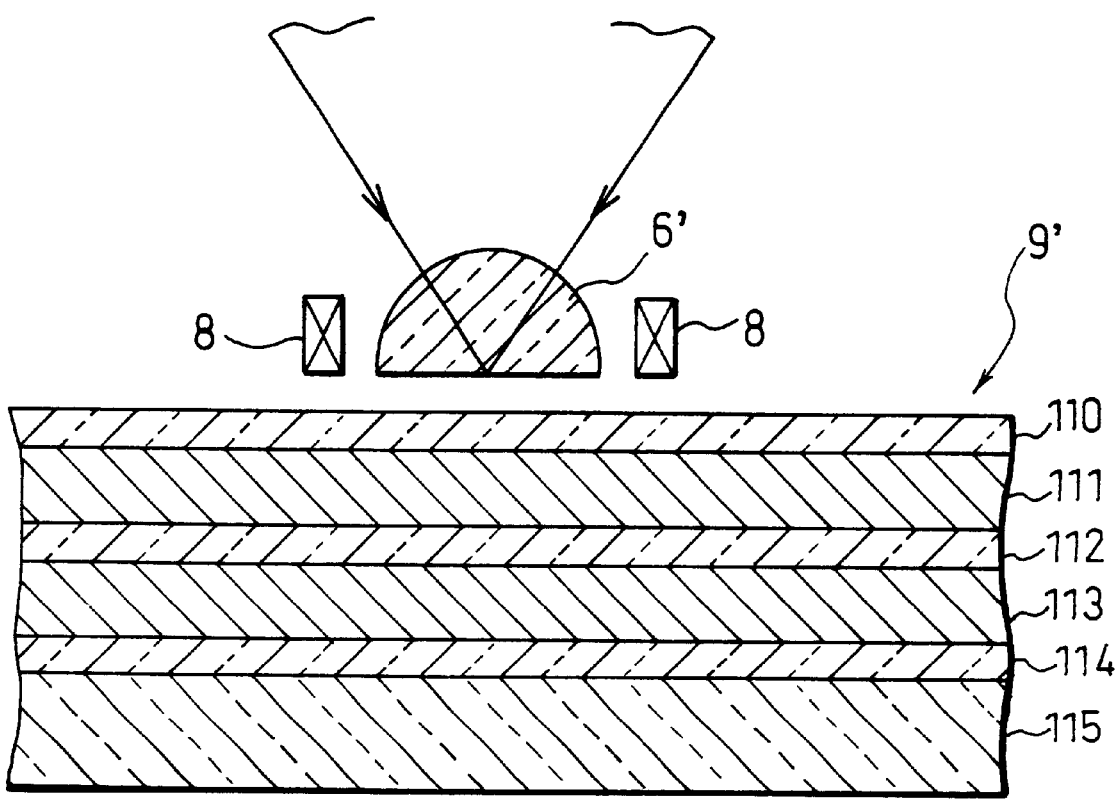
FIG. 12 is a cross sectional view of a comparative magneto-optical head and a comparative recording medium.

FIG. 12 shows an arrangement of the recording medium 9' which was used in the experiment to reproduce the MSR recording medium by the conventional SIL, and also the arrangement of auxiliary lens 6'. On glass substrate 115, there are provided transparent dielectric layer 114, recording layer 113, transparent dielectric layer 112, reproducing layer 111, and transparent dielectric layer 110. The material and thickness of each layer are as follows: transparent dielectric layer 114, made of AlN in 40 nm; recording layer 113, made of TbFeCo in 40 nm; transparent dielectric layer 112, made of AlN in 10 nm; reproducing layer 111, made of GdFeCo in 40 nm; and transparent dielectric layer 110, made of AlN in 30 nm. This is the arrangement of a conventional MSR recording medium in which reproducing layer 111 is provided within the recording medium 9'.

Figure 7:
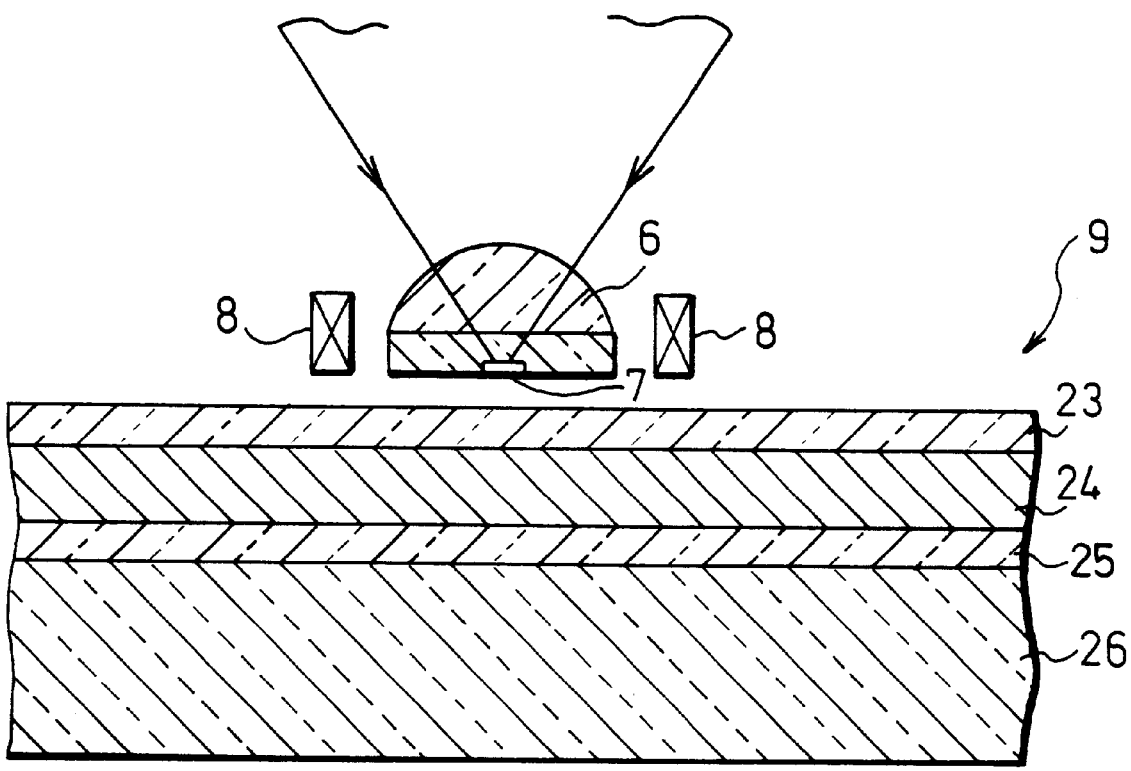
FIG. 7 is a cross sectional view of the magneto-optical head and recording medium.

FIG. 7 shows an arrangement of the recording medium 9 used in the experiment of reproducing the non-MSR medium by the MSR SIL of the present invention, and also the arrangement of auxiliary lens 6. FIG. 7 is a simplification of FIG. 2, and shows that transparent dielectric layer 25, recording layer 24, and transparent dielectric layer 23 are deposited on a plastic substrate 26. The transparent dielectric layer 25 is made of AlN in 20 nm, the recording layer 24 is made of TbFeCo in 40 nm, and the transparent dielectric layer 23 is made of AlN in 10 nm. Indicated by "7" is a reproducing magnetic layer, and it is provided on the auxiliary lens 6. With this arrangement, information is reproduced by transferring the recording mark which is recorded on the recording layer 24 of the recording medium 9, onto the reproducing magnetic layer 7 which is integrally provided on the auxiliary lens 6 on the side of the recording medium 9.

FIG. 8 is a graph which shows the relationship between the diameter of the reproducing magnetic layer 7 of the auxiliary lens 6 and the reproduced signal amplitude of a recording mark of 0.1 µm. The curve is normalized by the reproduced signal amplitude when the diameter of the reproduced signal amplitude 7 was at 0.8 µm.

When the diameter of the reproducing magnetic layer 7 exceeds 1.5 µm, as noted in FIG. 14, a transfer mark is reduced and almost no mark is transferred. When the diameter of the reproducing magnetic layer 7 becomes 1.5 µm or less, the force acting to reduce the transfer mark weakens gradually and transfer begins. As the diameter is further reduced, the transfer mark becomes larger. At the diameter of around 0.8 µm, the recording mark is completely transferred onto the reproducing magnetic layer 7. As the diameter of the reproducing magnetic layer 7 is further reduced to 0.5 µm or less, the diameter of the reproducing magnetic layer 7 becomes smaller than the beam spot diameter ø, and the quantity of the light associated with reproduction starts to decrease. Accordingly, in such a region, the reproduced signal amplitude becomes smaller. Thus, it is preferable that the diameter of the reproducing magnetic layer 7 is nearly the same or larger than the beam spot diameter ø, and not more than 10 times the size (diameter) of the recording mark.

EXAMPLE 2

The following will describe a manufacturing method of the MSR SIL of the present invention referring to FIG. 9(a) through FIG. 9(e).

First, as shown in FIGS. 9 (a) and 9 (b) on a flat glass substrate having a refractive index of 1.5 (transparent substrate 20), AlN is deposited as transparent dielectric medium 21 in a thickness of 30 nm by sputtering. Then, by placing a mask, GdFeCo is deposited as reproducing magnetic layer 7 in a thickness of 40 nm in a disk shape with the diameter of 0.8 µm, and after removing the mask, AlN is deposited again in 10 µm as the transparent dielectric medium 22.

Figure 9A:
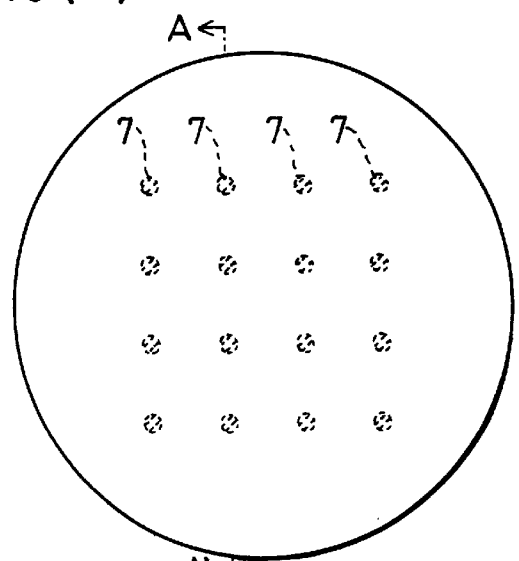
FIG. 9(a) through FIG. 9(d) are schematic drawing showing a manufacturing method of the magneto-optical head, in which 9(a) and 9(c) are plane views relating to manufacturing steps, and 9(b) and 9(d) are cross sectional views of 9(a) and 9(c) taken along the lines A–A' and B–B', respectively, and 9(e) is a perspective view showing the magneto-optical head.
Figure 9B:
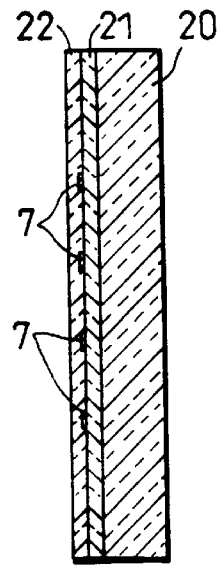
Figure 9C:
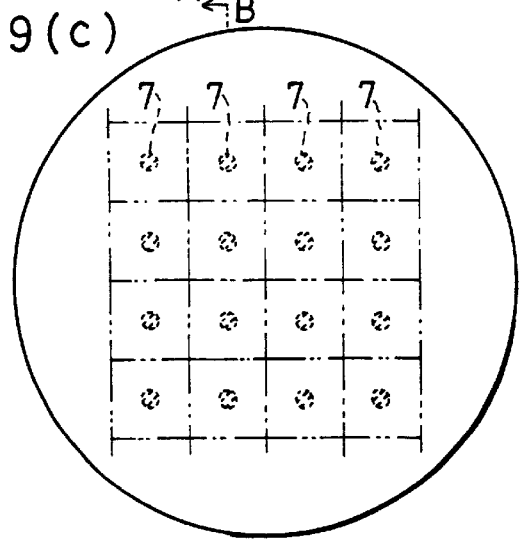
Figure 9D:
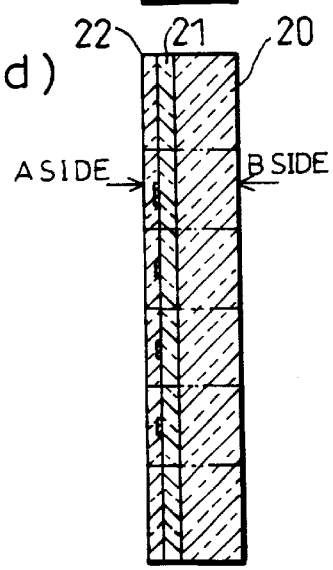
Figure 9E:
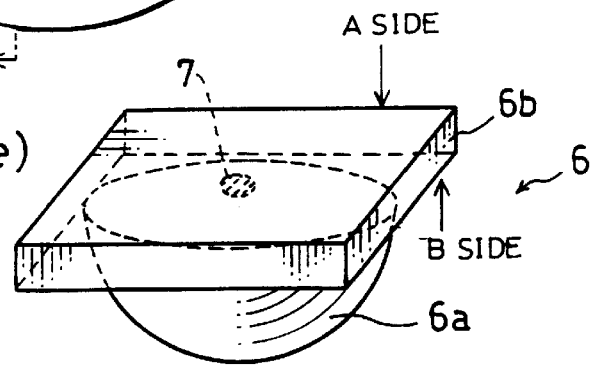

Then, as shown in FIGS. 9(c) and 9(d), the substrate is cut to obtain transparent element 6b, which makes up a portion of the auxiliary lens 6 of the MSR SIL. The A side of the transparent element 6b faces the medium, and, as shown in FIG. 9(e), to the B side of the transparent element 6b is attached spherical lens 6a having a refractive index of 1.5. Here, by using a resin, etc., having the same or nearly the same refractive index (here, around 1.5) as that of the spherical lens 6a and transparent element 6b to paste the two elements, unwanted reflection, etc., can be prevented. The auxiliary lens 6 of the MSR SIL is obtained in this manner.

EXAMPLE 3

The following will describe a manufacturing method of another MSR SIL of the present invention.

In FIG. 1, coil 8 for generating a recording magnetic field is provided around the auxiliary lens 6. In the MSR SIL used in the present Example, coil 8 is provided within the auxiliary lens 6. With this arrangement, the coil 8 as shown in FIG. 5 can be eliminated from sight, and the weight of the elements supported by the support cylinder 58 can be reduced, thus having the effect of easier tracking.

FIGS. 10(a) and 10 (b) show the manufacturing method. Namely, after providing coil 8 on the glass substrate (transparent substrate 20) by wafer process, transparent dielectric medium 21, reproducing magnetic layer 7, and transparent dielectric medium 22 are provided. Thereafter, as with FIG. 9(c), the substrate is cut, and as with FIG. 9(e), the substrate is attached to the spherical lens 6a to obtain auxiliary lens 6. The same effect as that of Example 1 was obtained with the auxiliary lens 6 as manufactured in this manner.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical head for carrying out recording and reproducing on a recording medium, comprising:
   an objective lens for converging light for raising a temperature of a recording layer of the recording medium, the recording layer having a maximum value of saturation magnetization between room temperature and a Curie temperature;
   an auxiliary lens for projecting the converged light on the recording layer by increasing an effective numerical aperture; and
   a reproducing magnetic layer, provided on said auxiliary lens, for reproducing information recorded on the recording layer by temporarily enhancing and transferring the information,
   said reproducing magnetic layer being provided on a position on which the converged light is projected.

2. The magneto-optical head as set forth in claim 1, including a coil for generating magnetic flux which is in accordance with information to be recorded, said coil being provided around the auxiliary lens and generating magnetic flux when recording information.

3. The magneto-optical head as set forth in claim 1, wherein said auxiliary lens is composed of a transparent element having the reproducing magnetic layer, and a lens element having a refractive index nearly equal to that of the transparent element, said transparent element and said lens element being pasted with each other.

4. The magneto-optical head as set forth in claim 3, wherein said lens element is a spherical lens, and a center of a sphere of the spherical lens is set to be on a focusing point of the objective lens.

5. The magneto-optical head as set forth in claim 4, wherein the reproducing magnetic layer is set to be on the focusing point of the objective lens.

6. The magneto-optical head as set forth in claim 3, wherein said transparent element includes a transparent substrate to be pasted with the lens element, and two layers of transparent dielectric medium which are deposited on the opposite side of the surface of the transparent substrate to be pasted with the lens element, and
   the reproducing magnetic layer is provided between the two layers of transparent dielectric medium.

7. The magneto-optical head as set forth in claim 6, wherein said transparent dielectric medium is made of AlN.

8. The magneto-optical head as set forth in claim 1, wherein said reproducing magnetic layer is provided to be larger than a recording mark which is recorded on the recording medium.

9. The magneto-optical head as set forth in claim 1, wherein an area of the reproducing magnetic layer is nearly equal to a spot area of the converged light.

10. The magneto-optical head as set forth in claim 1, wherein a direction of saturation magnetization of the reproducing magnetic layer is found within a plane of the reproducing magnetic layer at room temperature.

11. The magneto-optical head as set forth in claim 1, wherein the reproducing magnetic layer is made of an alloy of rare earth metal and transition metal.

12. The magneto-optical head as set forth in claim 11, wherein the reproducing magnetic layer is made of GdFeCo.

13. The magneto-optical head as set forth in claim 11, wherein a direction of magnetization of the transition metal is found within a plane of the reproducing magnetic layer at room temperature, and a direction of saturation magnetization of the reproducing magnetic layer and the direction of magnetization of the transition metal are opposite to each other.

14. The magneto-optical head as set forth in claim 1, wherein directions of magnetization of the reproducing magnetic layer are aligned in accordance with magnetic flux from the recording layer when reproducing the recording medium.

15. A magneto-optical device having the magneto-optical head of claim 1.

16. A magneto-optical device, comprising:
   a mobile optical system which includes the magneto-optical head of claim 1;
   a fixed optical system which includes a light source for emitting light, a relay lens provided on an optical axis, driving means for changing a position of the relay lens with respect to the optical axis, and a photoreceptor for receiving reflected light which includes information which results from projection of the light on the recording layer; and
   control means for controlling a projection position of the light on the recording medium, said control means carrying out positional control of the relay lens by driving the driving means when a target position of the light is within a domain of the reproducing magnetic layer, and said control means carrying out positional control of the mobile optical system when a target position of the light is outside of the domain of the reproducing magnetic layer.

17. The magneto-optical device as set forth in claim 16, wherein the driving means is an actuator.

18. A method for magneto-optically recording and reproducing information using a magneto-optical head for carrying out recording and reproducing on a recording medium having a recording layer which has a maximum value of saturation magnetization between room temperature and a Curie temperature, the magneto-optical head including: an objective lens for converging light for raising a temperature of the recording layer; an auxiliary lens for projecting the converged light on the recording layer by increasing an effective numerical aperture; and a reproducing magnetic layer, provided on said auxiliary lens, for reproducing information recorded on the recording layer by temporarily enhancing and transferring the information, said reproducing magnetic layer being provided on a position on which the converged light is projected,
   wherein, in reproducing, light is projected on the recording layer via the reproducing magnetic layer provided on the auxiliary lens, and information recorded on the recording layer is transferred to the reproducing magnetic layer by magnetic flux generated from the recording layer so as to reproduce the information using reflected light from the reproducing magnetic layer, and
   in recording, light is projected on the recording layer by varying an energy of the light from that used in reproducing, and an external magnetic field based on information to be recorded is applied so as to record the information on the recording layer.

* * * * *